Dec. 9, 1941.  K. C. BROWN ET AL  2,265,512
HEAT CONTROL SYSTEM
Filed Oct. 13, 1938
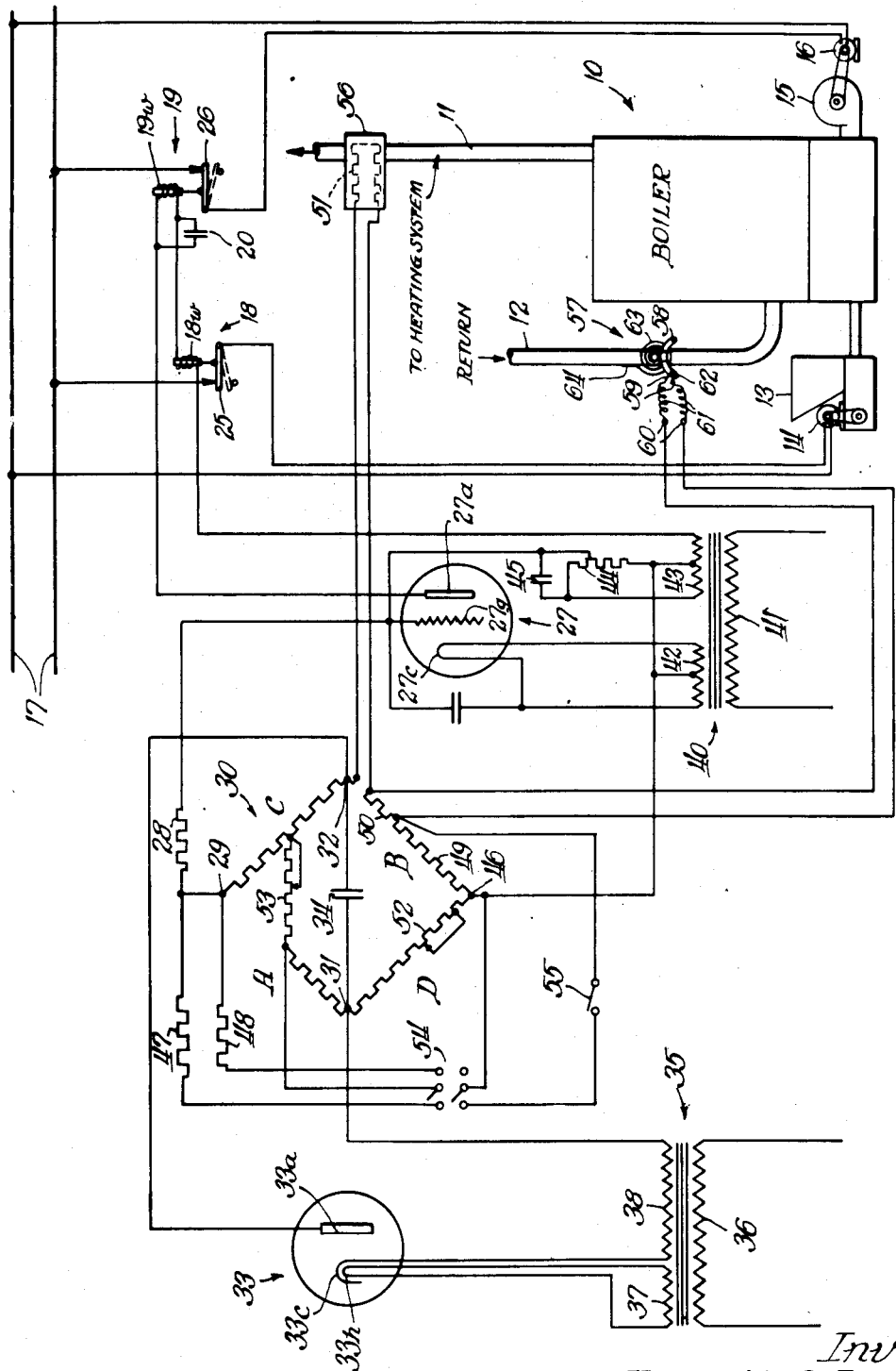
Inventors.
Kenneth C. Brown,
Fredric J. Weyher.
By Brown, Jackson, Boettcher & Dienner
Attys.

Patented Dec. 9, 1941

2,265,512

UNITED STATES PATENT OFFICE 2,265,512

HEAT CONTROL SYSTEM

Kenneth C. Brown, Evanston, and Fredric J. Weyher, Chicago, Ill.; said Weyher assignor to said Brown Application October 13, 1938, Serial No. 234,752

4 Claims. (Cl. 236—91)

Our invention relates, generally, to electrical control systems, and it has particular relation to such systems employed for controlling the heat supplied to a building or the like in accordance with one or more variable temperatures, the combination of which determines the temperature of the building.

In order to control the temperature of a building, several factors involved should be considered. The object is not only to control temperature, but to control temperature most economically. Control systems may be designed to do a fine job of controlling temperature, but they may at the same time cause the heating plant to operate inefficiently. The control system desired is one that will not only do a good job in regulating temperature, but will also do it with a maximum degree of efficiency.

The object of our invention, generally stated, is to provide a heat control system which, after a shut down, will bring a heating plant up to maximum operating capacity independently of the main control means and will, after the warm-up period, permit the heating plant to be turned back over to be controlled by the main control means.

Another object of our invention is to provide such a heat control system, as set forth above, that is universal in application to any heating plant and building and adjustable to operate under substantially any given set of conditions.

Accordingly, our invention is disclosed in the embodiment hereof shown in the accompanying drawing, and it comprises the features of construction, combination of elements and arrangement of parts which will be exemplified in the system hereinafter set forth and the scope of the application of which will be indicated in the appended claims.

For a more complete understanding of the nature and scope of our invention, reference may be had to the following detailed description, taken in connection with the accompanying drawing, in which the single figure illustrates diagrammatically one concrete embodiment of our invention.

Referring now to the drawing, it will be observed that the reference character 10 designates, generally, a boiler which is intended to be representative of any boiler that might be used for heating water and supplying it through a supply pipe 11 to a heating load such as ordinary hot water radiators. The heating water may be returned from the heating load to the boiler 10 through a return pipe 12. The boiler 10 may be fired by a stoker 13 driven by an electric motor 14, and natural draft alone or in combination with induced or forced draft may be used to obtain sufficient air supply. In addition to these provisions for air supply (not shown), an auxiliary blower 15 may be provided which can be driven by an electric motor 16. The purpose of the blower 15 is to provide means for quickly forcing or bringing the boiler 10 up to its maximum capacity after a low or shut down period in order that the heating system can be quickly brought up to its normal operating condition. The use of the blower 15 in this connection will be more fully brought out below in connection with the description of the operation of our control system.

The stoker motor 14 and the blower motor 16 may be connected for operation to a pair of energized conductors 17 through relays shown generally at 18 and 19, respectively. The energized conductors 17 may supply the motors 14 and 16 with 60-cycle, 110 volts, alternating current. The relays 18 and 19 are provided with operating windings 18w and 19w, respectively, which control the movement of contact members 25 and 26, according to their degree of energization. A capacitor 20 is connected across the winding 19w for preventing chattering of the relay 26. The contact members 25 and 26 are indicated by full lines in the closed position, and are indicated by broken lines in the open position. In order that in normal operation only contact member 25 will be in the closed position, relay winding 19w has a lower resistance than relay winding 18w.

With a view to controlling the energization of relay windings 18w and 19w, they are connected in series circuit relation with each other and in series circuit relation with an electric valve shown generally at 27. The electric valve 27 is povided with a cathode 27c, a control electrode or grid 27g, and an anode 27a. By varying the conductivity of the electric valve 27, it is possible to selectively control the operation of the relays 18 and 19 to in turn effect the selective operation of motors 14 and 16 for operating the stoker 13 and the blower 15, respectively.

The control of the conductivity of the electric valve 27 is effected by controlling the potential that is applied to the grid 27g. As shown, the grid 27g is connected through a suitable protective resistor 28 to one terminal 29 of a Wheatstone bridge circuit, shown generally at 30. The Wheatstone bridge circuit 30 comprises arms A, B, C, and D. By varying the resistances of certain of these arms, it is possible to change the potential of the grid 27g relative to the cathode 27c, as will be hereinafter set forth, with the result that the conductivity of the electric valve 27 is varied accordingly, as is well known.

The Wheatstone bridge circuit 30 is preferably energized with direct current. For this purpose, its terminals 31 and 32 are connected across a suitable direct current source. For example, in order to provide a suitable source of direct current a rectifier valve, shown generally at 33, may be provided, having an anode 33a, a cathode 33c, and a heating element 33h. Since the rectifier valve 33 is employed to provide half wave rectification of alternating current, a capacitor 34 is connected between the terminals 31 and 32 in order to reduce the ripple of the rectified half waves.

A transformer, shown generally at 35, is provided for energizing the bridge circuit 30. It has a primary winding 36 that may be connected to any suitable source of alternating current, such as 60-cycle, 110-volt source. The transformer 35 is also provided with secondary windings 37 and 38. As illustrated, the secondary winding 37 is employed for energizing the heater element 33h of the rectifier valve 33, while the secondary winding 38 provides the source of alternating current that is rectified for energization of the bridge circuit 30.

Another transformer, shown generally at 40, is provided for energizing the relay windings 18w and 19w, and for operating the electric valve 27. It has a primary winding 41 that may be connected to the same source of alternating current as the primary winding 36 of transformer 35. Also, the transformer 40 is provided with secondary windings 42 and 43. The secondary winding 42 serves to energize the cathode 27c, while the secondary winding 43 provides the operating potential for the plate circuit of the electric valve 27 and is connected to one terminal of the relay winding 18w of the relay 18. It will be observed that an adjustable resistor 44 and a capacitor 45 are connected to the secondary winding 43 and to the grid 27g for modifying the trigger action of the electric valve 27. The circuit for the grid 27g is completed by connecting the terminal 46 of the Wheatstone bridge circuit 30 to a midpoint of the secondary winding 42.

As indicated hereinbefore, the conductivity of the electric valve 27 is changed by varying the potential that is applied to the grid 27g. An increase in potential causes a decrease in conductivity and, vice versa, a decrease in potential causes an increase in conductivity. This is effected by varying the resistances of certain of the arms A, B, C, and D of the Wheatstone bridge circuit 30.

Taking arms A, B, and D separately, arm A includes in parallel a temperature variable resistor 47 and a fixed resistor 48; arm B includes fixed resistors 49 and 50 and a temperature variable resistor 51; and arm D includes an adjustable resistor 52 which is provided for adjusting the firing point of the electric valve 27. The midpoint of arms A and C are joined by an adjustable resistor 53. By regulating the adjustable resistor 53 the relationship between the temperature variable resistors 47 and 51 may be varied as desired.

The temperature variable resistor 47 is placed outside of the building whose temperature is to be controlled. It may be termed the outside unit and is preferably placed on the north side of the building. A two-way switch, shown generally at 54, is provided for alternately cutting resistors 47 and 48 into the arm A. When switch 54 is closed in the left hand position, temperature variable resistor 47 is cut into the arm A, and, when closed in the right hand position, fixed resistor 48 is cut into the arm A. A switch 55 is provided for cutting in or out resistor 49.

Temperature variable resistor 51 of arm B is disposed in a suitable housing 56 through which the heated water from the boiler 10 flows. Resistor 51 is so positioned that its temperature will be that of the water in the housing 56 and yet it is insulated therefrom in a suitable manner. Resistor 51 may be termed the boiler unit.

The resistor 50 of arm B is connected in parallel with a mercury switch, shown generally at 57, and is shunted thereby when the mercury switch 57 is in the closed position. The mercury switch 57 comprises a curved closed glass tube 58 with terminals 59 sealed in one end thereof and connected to binding posts 60 by a pair of flexible leads 61. A pool of mercury 62 is sealed into the glass tube 58 and rests in either end of the glass tube 58, depending upon its position. The glass tube 58 may be carried by a clip from the center end of a metallic spiral 63. The metallic spiral 63 is fastened to the return pipe 12 at 64 and is in heat conductive relation therewith. If the return pipe 12 is lagged, part of the lagging is removed in order that the spiral 63 may be installed. It will be seen that when the return pipe 12 is hot due to the temperature of the return water therein, the spiral 63 will be heated and will tend to unwind or straighten, as is well known. When the return pipe 12 cools, the spiral 63 will then close up again. Normally, the mercury pool 62 will be in the right end of the glass tube 58 and the mercury switch will be in the open position. However, when the return pipe cools and the spiral 63 contracts sufficiently, the glass tube will become tilted to the left far enough to allow the pool of mercury 62 to pass over the curve in the glass tube and to flow into the left end thereof, thereby immersing the terminals 59 and closing the mercury switch 57. Because of the curve in the glass tube 58 over which the mercury pool 62 must flow, snap-action will be obtained.

In describing the operation of our control system, for making it more fully understood, it may be assumed to be controlling the temperature of the building on a normal winter day. Under such conditions switch 54 will be closed in its left hand position, switch 55 will be closed, and the mercury switch 57 will be in the open position. The resistance of the temperature variable resistor 47, i. e., the outside unit, will be of such a value that the resistance of the temperature of variable resistor 51, i. e., the boiler unit, will be large enough so that the temperature of the water flowing through the housing 56 will have to be high enough to maintain the building at a predetermined temperature level. The conductivity of the electric valve 27 corresponding to these conditions will be of such a value as to energize relay winding 18w sufficiently so that the contact member 25 will be in the closed position, thereby completing the circuit to the motor 14 and causing it to drive the stoker 13. However, the conductivity of the electric valve 27 will not be great enough to energize the relay winding 19w sufficiently so that contact member 26 will be in the closed position. If, now, the outside temperature rises sufficiently, the resistance of the temperature variable resistor 47, i. e., outside unit, will increase, and this increase must be balanced by a corresponding decrease in the resistance of the temperature variable resistor 51, i. e., boiler unit, and, accordingly, a decrease in the temperature of the hot water going through the housing 56 will be called for. At this same time, the conductivity of the electric valve 27 will decrease due to the increase in the potential on the grid 27g, as is well understood. If the conductivity of the electric valve 27 falls enough, the relay 18 will open and the motor 14 driving the stoker 13 will be shut off, thus stopping the fuel supply for heating water. Whenever the temperature of the heating water flowing through the housing 56 drops below the level which corresponds to a certain outside temperature, the conditions in the bridge circuit 30 will change due to the change brought about in the resistance of the boiler unit 51 and the potential under the grid 27g will be decreased, thereby causing an increase in the conductivity of the electric valve 27. This increase in conductivity will permit the relay 18 to close, thereby starting up the stoker 13 again and causing more heat to be supplied to the heating water. It will be understood that the stoker 13 might be driven by a variable speed motor which might be made responsive to the conductivity of the electric valve 27, thus permitting a closer heat control to the heating water.

The above outlined daytime operations will be maintained as long as such temperature control is desired. However, in many buildings, as, for instance, apartment and office buildings, it is not necessary to maintain as high a temperature level at night as that required in daytime. Accordingly, this fact is usually taken advantage of to effect a saving in fuel. Our temperature control system is provided for shifting from daytime operation to nighttime operation. By opening the switch 55 it will be seen that the resistor 49 is cut in and, in order for the arm B to maintain its usual resistance, the resistance value of the boiler unit 51 must decrease accordingly. A demand for a lower resistance value of the boiler unit 51 means that a lower temperature of the heating water flowing through the housing 56 will be required. The switch 55 may thus be called a day-night switch. When our system is operating under night conditions the stoker 13 will run less often than in the daytime, or, if it were variably speed driven, it would run slower.

During the latter part of the night shutdown or low period—for example, about six o'clock in the morning—the boiler 10 will have reached a low point in operation. At about this period the building will soon have to be at the customary daytime temperature level. If the temperature were to be raised to this level under the control of the main part of our control system, hereinbefore described in connection with day and night operation, it would require much too long a period. Accordingly, we have provided the mercury switch 57 responsive to the temperature of the return water in the return pipe 12 which, when in the closed position, shunts or cuts out resistor 50 in the arm B. This unbalances the bridge circuit 30 to a much greater degree than the normal operating changes, and allows the conductivity of the electric valve 27 to rise to such a value that both relays 18 and 19 are in the closed positions. Accordingly, both the stoker 13 and the blower 15 will be put into operation, thereby forcing the boiler 10 and bringing it up to its maximum capacity in a much shorter time than is customarily required. The boiler 10 will continue to operate at its maximum capacity until the return water in the return pipe 12 is up to its normal daytime temperature, whereupon, the mercury switch 57 is so preadjusted that it will tilt to the open position, thereby decreasing the conductivity of the electric valve 27, resulting in movement of contact member 26 to the open position and causing the blower 15 to be shut down. After the mercury switch 57 is open, the boiler 10 will again be under the control of the main control system as described hereinbefore. By bringing the boiler 10 up to its maximum capacity is meant bringing it up to the limit allowed for by a pressure release valve or other safety device with which boilers are usually required to be provided.

It will be seen that this secondary control feature which brings the boiler 10 up to its maximum irrespective of the normal control system is especially important in spring and fall when the outdoor temperature approaches that at which no heat, or very little, is required for heating a building. This is due to the fact that during these periods the relationship between the temperature variable resistors 47 and 51 is such that only a small amount of heat is required and the operation of the boiler 10 will accordingly be correspondingly slowly increased, whereas in winter time, when this relation is changed, i. e., a greater differential between outdoor and building temperatures exists, the boiler 10 is brought up from shut-down operation to daytime operation at a greater rate.

In the summer time when the boiler 10 is used only for heating hot tap water and not for heating the radiators, the switch 54 will be closed in its right hand position. In this position the temperature variable resistor 47, i. e., outside unit, is cut out and the fixed resistor 48 is cut in the arm A. Under these conditions it will be seen that the temperature variable resistor 51 is the only variable resistor in the bridge circuit 30, and accordingly the conductivity of the electric valve 27 will be controlled in response to the temperature variable resistor 51 only. The two-way switch 54 may accordingly be called a winter-summer switch.

As an alternative to having the relay 19 connected to control the blower motor 16, it may be adapted to cut an auxiliary boiler into the supply pipe 11 when the heat demand is sufficient to cause the relay 19 to be closed.

It will be readily understood that our control system may be used in conjunction with steam heating systems and oil burners, powdered coal burners, and other types of heating plants.

Since certain changes may be made in the foregoing system and different embodiments of the invention may be made without departing from the scope thereof, it is intended that all matter contained in the foregoing description or shown in the accompanying drawing shall be interpreted as illustrative, and not in a limiting sense.

We claim as our invention:

1. The combination with a heat supply system for a building comprising, in combination, a heat source with a return line thereto and means for regulating the heat supplied by said heat source, of control means for said heat regulating means responsive to the conductivity of an electric valve, and a bridge circuit, the grid of said electric valve being connected to one terminal of said bridge circuit, said bridge circuit including a temperature variable resistor responsive to outside temperature, a temperature variable resistor responsive to the temperature of the heating medium in said heat source, and a mercury switch tilted to the off or on position in response to metallic expansion and contraction effected in response to the temperature of the heating medium in said return line, the potential on said grid and thereby the conductivity of said electric valve being controlled by the combined effect of the variable resistances of said temperature variable resistor responsive to outside temperature and said temperature variable resistor responsive to the temperature of the heating medium in said heat source and of the position of said mercury switch.

2. In a system for controlling the heat supplied to a heated structure from a source provided with heating fluid supply and return conduits and with different temperature control means each energized through a different electric switch, the combination of an electron tube provided with an input circuit and with an output circuit including means for causing said switches to be operated in sequence in response to different values of current in said output circuit, means including a bridge circuit for applying to said input circuit a resultant potential responsive to a temperature outside said structure and to the heating fluid temperatures in said supply and return conduits for selectively energizing one of said temperature control means only when the heating fluid temperature in said return conduit has decreased to a predetermined value.

3. In a system for controlling the heat supplied to a heated structure from a source provided with heating fluid supply and return conduits and with different temperature control means each energized through a different electric switch, the combination of an electron tube provided with an input circuit and with an output circuit including means for causing said switches to be operated in sequence in response to different values of current in said output circuit, means including a bridge circuit for applying to said input circuit a resultant potential responsive to a temperature outside said structure and to the heating fluid temperatures in said supply and return conduits for selectively energizing one of said temperature control means only when the heating fluid temperature in said return conduit has decreased to a predetermined value, and means for rendering said system unresponsive to said outside temperature.

4. In a system for controlling the heat supplied to a heated structure from a source provided with heating fluid supply and return conduits and with different temperature control means each energized through a different electric switch, the combination of an electron tube provided with an input circuit and with an output circuit including means for causing said switches to be operated in sequence in response to different values of current in said output circuit, means including a bridge circuit for applying to said input circuit a resultant potential responsive to a temperature outside said structure and to the heating fluid temperatures in said supply and return conduits for selectively energizing one of said temperature control means only when the the heating fluid temperature in said return conduit has decreased to a predetermined value, and means for adjusting the relation between the control effects of said outside and supply conduit heating fluid temperatures.

KENNETH C. BROWN.
FREDRIC J. WEYHER.